United States Patent [19]

Hart

[11] 4,124,254
[45] Nov. 7, 1978

[54] VEHICLE BRAKING SYSTEM
[75] Inventor: Cullen P. Hart, Peoria, Ill.
[73] Assignee: Caterpillar Tractor Co., Peoria, Ill.
[21] Appl. No.: 837,960
[22] Filed: Sep. 29, 1977
[51] Int. Cl.² .................................................. B60T 13/10
[52] U.S. Cl. ........................................... 303/2; 303/7; 303/9; 303/71
[58] Field of Search ..................... 303/71, 2, 3, 6 M, 9, 303/13, 7

[56]  References Cited
U.S. PATENT DOCUMENTS

| | | | |
|---|---|---|---|
| 3,582,150 | 6/1971 | Williams | 303/13 |
| 3,650,568 | 3/1972 | Poplawski | 303/9 |
| 3,761,139 | 9/1973 | Rogers | 303/9 |
| 3,778,115 | 12/1973 | Ryburn | 303/3 |
| 3,900,227 | 8/1975 | Smith | 303/7 |
| 3,917,037 | 11/1975 | Prillinger | 303/9 |
| 3,957,315 | 5/1976 | Cummins | 303/13 |

*Primary Examiner*—Trygve M. Blix
*Assistant Examiner*—Reinhard J. Eisenzopf
*Attorney, Agent, or Firm*—Charles E. Lanchantin, Jr.

[57]  ABSTRACT

A vehicle braking system has a spring engaged and fluid released drive line brake, a pair of fluid engaged and spring released service brakes, and a control circuit for applying only the service brakes over a preselected braking force range and for applying the service brakes and the drive line brake in response to a braking force greater than said preselected range. The control circuit preferably includes an inverter valve, and also an override valve for selectively applying the drive line brake independently of the operation of the service brakes.

7 Claims, 2 Drawing Figures

VEHICLE BRAKING SYSTEM

BACKGROUND OF THE INVENTION

The present invention relates to a braking system for a vehicle, and more particularly to a system for automatically supplementing the braking efffort of the service brakes with a drive line brake.

Some vehicles employ a secondary brake in addition to the primary service brakes for positively effecting parking or emergency braking. The secondary or drive line brake on some motor graders, for example, is spring engaged and fluid released and is associated with the vehicles drive line substantially independently of the service brakes. In the event of the loss of absence of sufficient fluid pressure in the vehicle's braking system, the drive line brake is automatically applied. While this is a valuable feature, the capacity of the drive line brake in not utilized during normal actuation of the four fluid engaged and spring released service brakes which are individually located in each of the tandem wheels of the motor grader. This means that the number of service brakes, or the total capacity of the service brakes must be sufficient to provide full braking of the vehicle under normal driving conditions which results in additional expense and a waste of labor and materials.

In view of the above, it would be advantageous to provide a control system that will release fluid pressure to the drive line brake and increase fluid pressure to the service brakes under preselected conditions of operation for effectively utilizing the additional available capacity of the drive line brake during normal service braking.

SUMMARY OF THE INVENTION

The present invention is directed to overcoming one or more of the problems as set forth above.

According to the present invention, a braking system for a vehicle having a drive line brake and a pair of service brakes has a control circuit for applying only the service brakes over a preselected braking force range, and for applying the service brakes and the drive line brake in response to a braking force greater than said preselected range. Preferably, the control circuit includes an inverter valve in fluid communication with the service brakes and the drive line brake for releasing fluid pressure to the parking brake simultaneously with an increase in the fluid pressure supplied to the service brakes.

DETAILED DESCRIPTION

Figure 1:
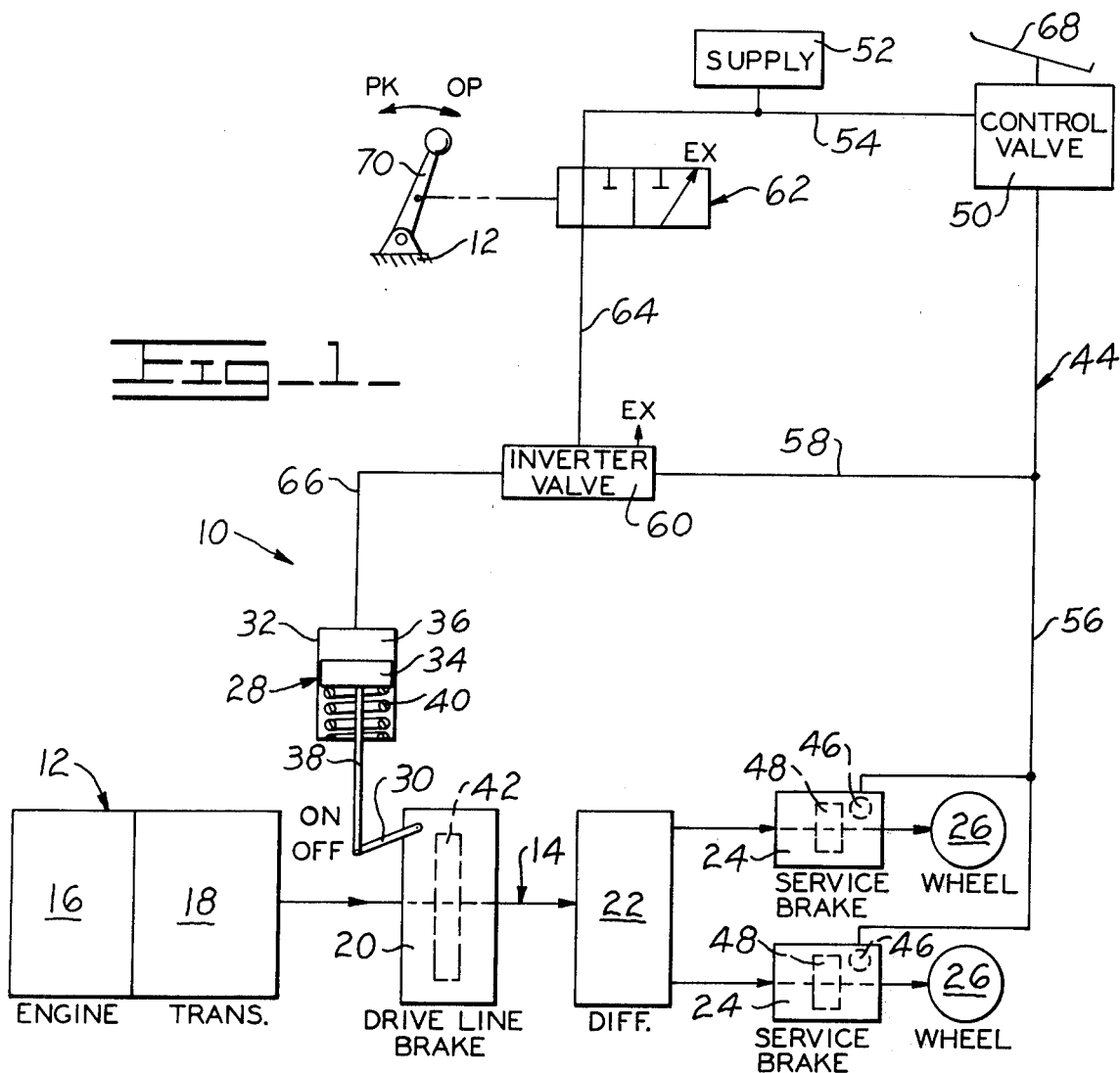
FIG. 1 is a diagrammatic view of a vehicle drive line incorporating the braking system of the present invention.

Referring to FIG. 1, a vehicle braking system 10 of a vehicle 12 has a drive line 14 including in series relation an engine 16, a transmission 18, a parking or drive line brake 20, a differential 22, and a pair of symmetrically oppositely disposed service brakes 24 cooperating individually with one or more driven wheels 26.

The first brake or drive line brake 20 is preferably spring engaged and fluid released as by including a brake release rotochamber 28 mechanically coupled to a control element 30 which mechanically actuates the drive line brake accordingly to its pivotal disposition. For example, the control element shown is pivotally movable in a generally clockwise direction from an off or brake release position as illustrated to an on or brake engaged position by the rotochamber. The rotochamber has a housing 32, a reciprocable piston 34 therein which defines within the housing a release chamber 36, a rod 38 pivotally connected to the control element and secured to the piston, and mechanical biasing means 40 disposed between the housing and piston for continually biasing the rod and control element upwardly when viewing the drawing toward the brake engaging position. When the release chamber is sufficiently depressurized then the biasing means or spring means 40 initiates clockwise movement of the control element 30 so that a first rotatable member 42 within the drive line brake is frictionally engaged with respect to the frame of the vehicle 12 to retard or stop the drive line 14.

The second brake or the service brakes 24, on the other hand, are preferably fluid engaged and spring released and are disposed next to the respective wheels 26. A control circuit or control means generally identified by the reference number 44 is in fluid communication with the brake release rotochamber 28 and with an actuating chamber 46 associated with each of the service brakes for effective and automatic operation thereof. When the actuating chambers 46 are pressurized sufficient to overcome suitable spring retraction means within the service brakes, not shown, a second rotatable member 48 adjacent each of the wheels is frictionally connected to the frame of the vehicle 12 to retard or stop the drive line 14.

The control means 40 preferably includes a manually operated control valve 50 connected to a supply source 52 of fluid at a preselected pressure through a supply conduit 54 and also connected with the service brakes 24 by way of a control conduit 56. A signal conduit 58 is connected to the control conduit 56 and leads to an inverter valve 60. Such inverter valve is of conventional construction such as is supplied by Bendix Corp. of Southfield, Michigan under part number 287788.

A manually operated two position override valve or parking valve 62 is also in fluid communication with the supply conduit 54 so that fluid pressure is supplied to a second supply conduit 64 leading to the inverter valve 60 during normal vehicle travel. A delivery conduit 66 is connected between the inverter valve and the chamber 36 for selected operation of the brake release rotochamber 28 and the drive line brake 20.

In operation, during normal forward or reverse traveling of the vehicle 12, the parking valve 62 is manually disposed in the open position shown so that fluid pressure, preferably air, is supplied to the first and second supply conduits 54 and 64 at a preselected level of about 120 psi. Manual depression of a brake pedal 68 of the control valve 50 provides modulatably controlled communication of the air in the supply conduit 54 with the control conduit 56 leading to the service brakes 24. As the brake pedal is depressed, the pressure in the conduit 56 increases to substantially directly and proportionately apply the service brakes in the usual manner. As the pressure rises in the branch control conduit 58, the inverter valve 60 automatically reduces fluid communication between the second supply conduit 64 and the delivery conduit 66 at a substantially one-to-one pressure ratio. When the pressure in the delivery conduit is reduced to about 50 psi, the spring means 40 in the rotochamber 28 will begin to move the piston 34 upwardly when viewing FIG. 1 to rotate the control element 30 through the rod 38 and to initially supply the drive line brake 20.

Figure 2:
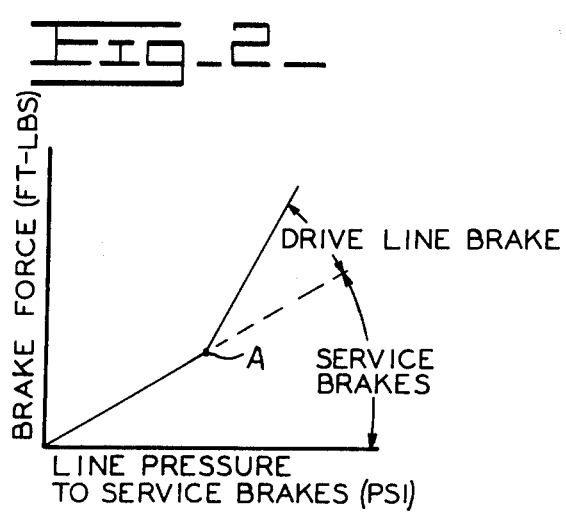
FIG. 2 is a graph showing the relationship of the amount of braking force provided by the service brakes and the drive line brake as a function of the line pressure to the service brakes.

Thus, as shown best in the graph of FIG. 2, the service brakes 24 are gradually engaged with depression of the brake pedal 68 in direct proportion to the rising line pressure in the conduits 56 and 58 over a preselected braking force range up to the level indicated by the letter A on the graph. For example such braking force range may correspond to a pressure of about 0 to 80 psi in the conduits 56 and 58, and a preselected level of about 50 psi in the delivery conduit 66. Thereafter, with an increase in the pressure in the supply conduits as a result of depressing the brake pedal 68 an additional amount, the pressure in the delivery conduit will be proportionately lowered from that preselected level to release the pressure in the chamber 36 of the rotochamber 28 and to allow the spring means 40 to gradually apply the drive line brake 20 simultaneously with the further application of the service brakes. When the pressure in conduits 58 and 64 is substantially equal the pressure in the delivery conduit 66 is zero and the drive line brake is fully applied.

It is of note that the parking and emergency fuction provided by the override or parking valve 62 is not impaired by the inverter valve 60. Specifically, when the control element 70 is moved to the left to its parking or emergency mode of operation, the second supply conduit 64 leading to the inverter valve is blocked from communication with the supply conduit 54 and is exhausted, whereby any fluid pressure in the delivery conduit 66 is also controllably exhausted through the response of the inverter valve so that the drive line brake 20 is fully applied by the action of the spring means 40 independently of the operation of the service brakes 24.

Thus, the braking system of the present invention provides a control means for releasing fluid pressure to a parking or drive line brake to allow it to be automatically applied only upon reaching a preselected level of braking force in the service brakes, and thereafter for proportionately applying the drive line brake as well as the service brakes. Advantageously, a relatively simple control circuit embodying only three valves 50, 60 and 62 is utilized to effect positive control of these brakes under normal traveling conditions, and to provide an override for automatically or manually applying the drive line brake independently of the operating condition of the service brakes. Therefore, any decrease in pressure in the conduit 64 below the preselected level will automatically cause the drive line brake to be applied.

Other aspects, objects and advantages of this invention can be obtained from a study of the drawings, the disclosure and the appended claims.

The embodiments of the invention in which an exclusive property or privilege is claimed are defined as follows:

1. In an improved vehicle braking system having a spring engaged and fluid released drive line brake and a pair of fluid engaged and spring released service brakes arranged in the drive line of a vehicle, the improvement comprising:
   control means in fluid communication with said drive line brake and said service brakes for controllably applying only said service brakes over a preselected braking force ranged and for thereafter automatically controllably applying said service brakes and said drive line brake in response to a braking force requirement greater than said preselected range.

2. The vehicle braking system of claim 1 including means for selectively applying said drive line brake independently of the operation of said service brakes.

3. In an improved vehicle braking system having a spring engaged and fluid released first brake and a fluid engaged and spring released second brake arranged in the drive line of a vehicle, the improvement comprising:
   control means in fluid communication with said first and second brakes for controllably applying only said second brake over a preselected braking force range and for thereafter automatically controllably applying both said first and second brakes, said control means including a source of fluid pressure and an inverter valve disposed in fluid communication with said source, said first brake and said second brake.

4. The vehicle braking system of claim 3 wherein said control means includes a delivery conduit between said inverter valve and said first brake, a control valve connected to said source, and a control conduit connected to said control valve and to said second brake for controllably engaging said second brake in response to increasing pressure in said control conduit, said control conduit being connected to said inverter valve, and said inverter valve being of a construction sufficient for decreasing fluid pressure in said delivery conduit in response to increasing pressure in said control conduit.

5. The vehicle braking system of claim 4 wherein said inverter valve is of a construction sufficient for directly decreasing fluid pressure in said delivery conduit at a preselected pressure ratio in response to increasing pressure in said control conduit.

6. The vehicle braking system of claim 3 wherein said control means includes a normally pressurized delivery conduit connected between said inverter valve and said first brake, and a manually controlled valve connected between said source and said inverter valve for controllably, selectively reducing pressure in said delivery conduit and engaging said first brake independently of the operation of said second brake.

7. The vehicle braking system of claim 3 including means for selectively applying said first brake independently of the operation of said second brake.

* * * * *